United States Patent [19]

Hasegawa

[11] 4,337,592
[45] Jul. 6, 1982

[54] METHOD OF CONTROLLING COCKROACHES

[75] Inventor: Tokuichiro Hasegawa, Nagoya, Japan

[73] Assignee: Takashi Kawai, Hajima, Japan; a part interest

[21] Appl. No.: 246,710

[22] Filed: Mar. 23, 1981

Related U.S. Application Data

[63] Continuation of Ser. No. 99,086, Nov. 30, 1979, abandoned.

[30] Foreign Application Priority Data

Oct. 24, 1978 [JP] Japan .................................. 53-130799

[51] Int. Cl.³ .............................................. A01M 1/04
[52] U.S. Cl. ....................................... 43/113; 43/107; 43/121; 43/132 R
[58] Field of Search ...................... 43/132 R, 107, 121, 43/113

[56] References Cited

U.S. PATENT DOCUMENTS

| | | | |
|---|---|---|---|
| 1,819,551 | 8/1931 | Gourdon | 43/113 |
| 2,681,467 | 6/1954 | Guyer | 43/107 |
| 4,117,624 | 10/1978 | Phillips | 43/114 |
| 4,127,961 | 12/1978 | Phillips | 43/113 |

FOREIGN PATENT DOCUMENTS 101787  8/1937  Australia .............................. 43/113

Primary Examiner—Stephen G. Kunin
Assistant Examiner—J. T. Zatarga
Attorney, Agent, or Firm—Moonray Kojima

[57] ABSTRACT

A method of controlling cockroaches by irradiation thereof using ultraviolet rays.

6 Claims, 2 Drawing Figures

Fig_1
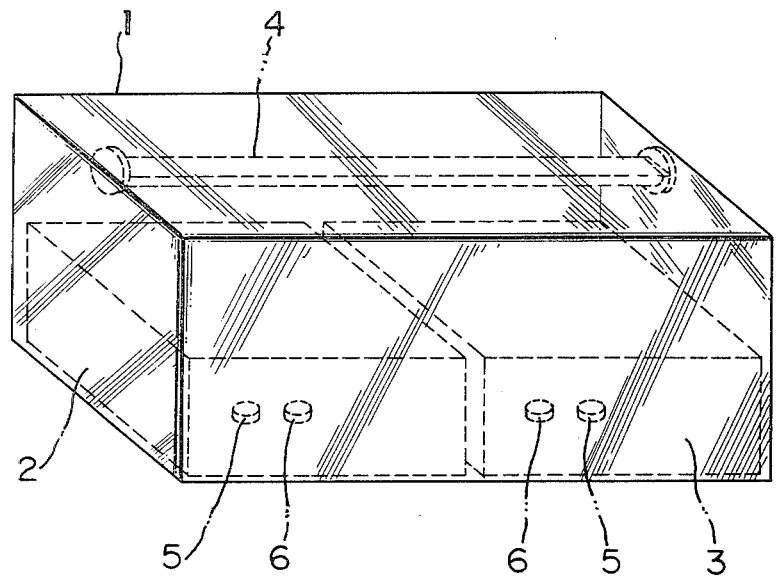
Fig_2

METHOD OF CONTROLLING COCKROACHES

This is a continuation of application Ser. No. 99,086, filed Nov. 30, 1979, and now abandoned.

BACKGROUND AND SUMMARY OF THE INVENTION

The cockroach is an injurious mechanical transmitter of infectious disease. It is a swift running, nocturnal insect which hides in inaccessible places. Because of this, although various means have been priorly employed, it is difficult to perfectly control cockroaches. Some of the more widely used control methods are, for example, spraying insecticide on floors, and exposed surfaces; and using capturing boxes coated with insecticide adhesive. But, disadvantageously, the insecticide loses effectiveness with the passage of time. The spraying method has a fatal flaw in that the the spray cannot be directed at tablewares, foods, etc. As to the use of capturing boxes, they cannot be readily used in many places, due to the different shapes and sizes. To date, none of the prior control methods has been satisfactory.

Accordingly, it is an object of the invention to eliminate the deficiencies of the prior art and effectively control cockroaches.

Another object of the invention is a cockroach control method which can be employed in different places.

A further object is a control method which is safe and hygienic.

BRIEF DESCRIPTION OF THE DRAWING

FIG. 1 depicts an outlined perspective view of an experimental device used in the invention; and FIG. 2 depicts an outlined perspective view of a shelter used in experiments in the invention.

DETAILED DESCRIPTION OF THE PREFERRED EMBODIMENTS

In studying the ecology of the cockroach, the inventor discovered that the cockroach is adversely affected by ultraviolet rays. Although ultraviolet rays have been used priorly for sterilization, it was never before known that ultraviolet rays are effective in killing cockroaches. In this respect, the inventor carried out the following experiments to confirm this fact.

In FIG. 1, there is depicted transparent plastic containers 2 and 3 disposed within an opaque container 1 having a bottom area of 30×37 cm² and a height of 22 cm. Five different kinds of cockroaches (identified below) were released in each of the containers 2,3. Small sized Schale 5,6 containing water and mouth powder feed were placed in the plastic containers 2,3 as cockroach feed. Talc was coated over the inside surface of container 1 and the inside wall surfaces of plastic containers 2,3 so that the cockroaches could not escape and so that the ultraviolet light would not be changed in strength of irradiation by any cockroach crawling up the walls. A holder type ultraviolet germicidal lamp 4 was provided at a height of 30 cm from the level of the cockroaches, so that the ultraviolet light was effected uniformily at their level. Lamp 4 used in these experiments has the following properties:

TABLE 1.

| Size (W) | Length (mm) | Diameter (mm) | Voltage (V) | Ultraviolet Rays (mA) | (W) |
|---|---|---|---|---|---|
| 10 | 330 | 25 | 100 | 230 | 1.8 |

The cockroaches used were of five different kinds, namely, *P. americana; P. fuliginosa; P. austrasiae; B. germanica;* and *N. cinerea.* Each of the experiments was carried out more than three times under conditions of 28° C. and in a temperature and humidity control room, and an average value was obtained. Table 2 shows the effectiveness in killing cockroaches of the continuous irradiation of ultraviolet light.

As is apparent from Table 2 hereinbelow, when ultraviolet light was continuously irradiated, the cockroaches, other than *N. cinerea* adult, were almost all killed in 3 to 4 days. Since the *N. cinerea* adult lives outdoors, the killing action of the ultraviolet rays was not observed. However, almost all of them had turned over on their backs, although they were able to later recover.

TABLE 2

| Average Mortality Time(hrs) | P. americana (%) | | | P. fuliginosa (%) | | P. austrasiae(%) | | | B. germanica (%) | | | N. cinerea (%) | | |
|---|---|---|---|---|---|---|---|---|---|---|---|---|---|---|
| | A. | L. | 1st. | A. | 1st. | A. | L. | 1st | A. | L. | 1st | A. | L. | 1st. |
| 3 | | | 0.0 | | 3.0 | | | 5.0 | | | 93.3 | | | |
| 5 | | 52.7 | | | 100.0 | | | 100.0 | | | 100.0 | | | |
| 7 | | 95.7 | | | | | | | | | | | | |
| 9 | | 100.0 | | | | | | | | | | | | |
| 24 | | 10.0 | | 13.3 | | | 6.6 | | 14.8 | 8.7 | | | | |
| 48 | 40.0 | 85.0 | | 80.0 | | 26.6 | 26.6 | | 72.25 | 69.4 | | | | |
| 54 | 86.6 | 100.0 | | 100.0 | | 73.3 | 100.0 | | 97.5 | 94.7 | | 25.0 | | |
| 72 | 100.0 | | | | | | 100.0 | | 98.8 | 100.0 | | 50.0 | | |
| 78 | | | | | | | | | 100.0 | | | 75.0 | | |
| 96 | | | | | | | | | | | | 6.8 | 100.0 | |
| 120 | | | | | | | | | | | | 26.6 | | |
| 140 | | | | | | | | | | | | 100.0 | | |

Note: "A" = adult. "L" = larvae (middle aged. "1st" = larvae

Another experiment was carried out to determined the effectiveness of the ultraviolet light using the same conditions as above but with the light being turned on and off at intervals of 15 minutes. The cockroaches used in this test was the species *P. americana.* The results are shown in Table 3.

TABLE 3.

| Average mortality time (hours) | P. americana | | |
|---|---|---|---|
| | adult | larvae | 1st larvae |
| 9 | | | 100% |
| 24 | | | |
| 48 | | 30.0% | |
| 72 | 15.5% | 100.0% | |
| 78 | 73.3% | | |
| 96 | 100.0% | | |

From this experiment, it can be seen that 100% of the adults were killed in 70 to 96 hours; 100% of the middle-aged larvae were were killed in 48 to 78 hours; and 100% of the 1st larvae were killed within 9 hours. This fact means that the cockroaches did not recover during the time the ultraviolet light was off (i.e. 15 minutes); and that unexpectedly, the discontinuous irradiation had remarkable kiling effect in a shorter period of time than for continuous irradiation (the lighting time was ½ of the continuous). These experiments were helpful when the present invention was applied to an actual apparatus.

Another experiment was carried out using ultraviolet light which was turned on and off at intervals of 12 hours. The results are shown in Table 4 hereinbelow.

As shown in Table 4, the 1st larvae was killed within 9 hours as in the case of use of continuous radiation, and the adults turned over when exposed to light for 170 hours, but did not die. It is assumed that the weakened ones recovered during the time the ultraviolet light was off for 12 hours. From this it can be seen that the effectiveness of discontinuous irradiation depends upon suitable time periods, and other conditions which can be suitably controlled for practice of the invention.

TABLE 4

| Average Mortality required time(hrs) | P. american Adult | 1st larvae |
|---|---|---|
| 7 | | 95.7% |
| 9 | | 100.0% |
| 48 | 13.3% | |
| 72 | 26.6 | |
| 96 | 66.6 | |
| 120 | 73.3 | |
| 144 | 80.0 | |
| 170 | 83.3 | |

The inventor observed the lethal action and the activity of the cockroach with respect to a shelter 7 prepared within the plastic containers 2,3. In this embodiment, an aluminum shelter 7 as shown in FIG. 2 was positioned at the corners within plastic containers 2,3 and a sooted paper was laid on the lighted face, and water and food were placed thereon. The results are shown in Table 5 hereinbelow.

As shown in Table 5, the 1st larvae was 100% killed in 11 hours even though shelter 7 was used. The larvae (middle aged) and adults were not all killed even after 170 hours, but no trace was observed on the sooted paper. The insects did not go out of the shelter and hid therewithin. This fact suggests that continuous radiation of ultraviolet rays kills cockroaches, or if they are within a shelter, would remain there and die of starvation so as to escape exposure to ultraviolet rays.

TABLE 5

| Average mortality time (hours) | p. americana | | |
|---|---|---|---|
| | Adult | Larvae(middle aged) | 1st |
| 7 | | | 3.3% |
| 9 | | | 95.0 |
| 11 | | | 100.0 |
| 24 | | | |
| 48 | 3.3% | 3.3% | |
| 72 | 20.0 | 13.3 | |
| 96 | 43.3 | 43.3 | |
| 120 | 46.7 | 76.0 | |
| 144 | 53.3 | 90.0 | |
| 170 | 63.3 | 90.0 | |

The above experiments are only examples of the present invention. For instance, it can be understood from the above examples that the time take for the lethal action may be shortened by increasing the amount of ultraviolet rays. The amount of rays is dependent on the amount which may be harmful to a human being, cost, and other factors, and a suitable amount is selected in accordance with the conditions at the situs of use.

In view of these circumstances, other embodiments may be employed to practice the invention. The present invention may preferably be used on sideboards in a kitchen, with the ultraviolet light installed at a suitable level above the surface exposed to cockroach infestation, and using suitable timers for continuous or discontinuous irradiation for selected intervals.

According to the invention, there were observed other effects of the ultraviolet light on cockroaches, as discussed below.

1. Effect on aggregation pheromone of cockroaches

The aggregation pheromone of the cockroach is secreted into an intestine from the lectual pud which is a secretive cell on the hind gut, and is expelled together with excrement. The aggregation pheromone contained in the excrement attracts the cockroach and functions to make the aggregation. The cockroach is facilitated in growth by producing aggregation, and increases its reproduction rate. It was observed that the activity of the aggregation pheromone having such function was eliminated by irradiation with ultraviolet light. This fact means that the ultraviolet light has a killing effect, and also prevents population increase which successively invades by attraction, since the activity of aggregation pheromone is eliminated. Thus, the usefulness of ultraviolet light is heightened as a means of controlling cockroaches.

A method of bioassay, discussed below, showed the phenomenon that the activity of aggregation pheromone was eliminated by the irradiation of ultraviolet light.

The aggregation pheromone was extracted from the excrement by using methanol. This extract was impregnated on 20 sheets of filter paper. 10 sheets were placed under the ultraviolet light for 5 to 10 minutes to extinguish the pheromone activity. The other 10 sheets were dried under an interior lamp. The papers treated with the ultraviolet radiation and the non-treated papers were folded in a W-shape and set within a Schale. Then, about 20 nymphs were put in for carrying out a preference test ten times per each kind to see which filter papers they would go to. As a result, almost all of the larvae gathered on the paper which was not treated with ultraviolet light. It is assumed that the activity of the extracted aggregation pheromone was suppressed or eliminated by the irradiation with ultraviolet light. The same preference test was also performed with the same type of filter paper which was exposed to black light for 1 hour. The results showed that a significant difference was not provided in the population assembling at papers exposed to black light and paper not exposed. It was observed that the short wave length of the black light lamp did not have any eliminative effects on aggregation pheromone. The same experiment was carried out under sun light. In this case, although not completely, the larvae in each kind much adhered significantly to the treated paper in 7 to 8 times, and in other 2 to 3 times, a significant difference was not found in both papers. From the fact that sun light emits waves of more than 291.0 nm and black light has waves at a peak of around 350 nm, it is assumed that the wave of the ultraviolet light is at the long wave length. Through these experiments, it became apparent that the activity of the aggregation pheromone was eliminated by irradiation with ultraviolet light. Further investigation was made to a practical case as to whether or not the same effect would be found in the aggregation pheromone covered with excrement.

The same preference test was performed by sticking the excrement to a filter paper with a non-smeed paste. The radiation time was one hour. Also, in this case, it was seen that the activity was substantially eliminated.

2. The melanization of cuticular after molting and the inhibiting action of hardening The cockroach molts about 7 or 8 times in one generation. If the adult, just after molt, or the larvae are exposed to ultraviolet rays for 30 to 60 minutes, they are impeded non-recoverably in melanization or hardening. A remarkable control effect was discovered, that the impeded population died within 1 to 2 days after irradiation of only 30 minutes. The younger the instar is, the more remarkable the effect is. The first instar larvae died as white stage by the irradiation of ultraviolet light for only 15 minutes.

3. The inhibiting action of molting

The population molting under irradiation of the ultraviolet light cannot perfectly molt because the molt is soft and die halfway of molting. The younger the instar is, the more remarkable this effect is.

4. The inhibiting effect on forming ootheca

If the female adult holding ootheca is exposed to the ultraviolet light for one hour, the ootheca produced is incomplete or impeded in the melanization or hardening. This is an important effect causing the death of the ootheca. The adult is also inhibited non-recoverably in the ability to form ootheca. Subsequently, the ootheca was not formed at all during the observation period of 20 days.

It may be conceivable that these effects will be further increased by using ultraviolet light of shorter wavelength.

The foregoing description is illustrative of the principles of the invention. Numerous other variations and extensions thereof would be apparent to the worker skilled in the art. All such other variations and extensions are to be considered to be within the spirit and scope of the invention.

What is claimed is:

1. Method of controlling cockroaches, comprising the step of irradiating said cockroaches with discontinuous ultraviolet rays, said irradiating being alternately on and off for 15 minutes each, for a total time of from 9 to 96 hours, and wherein said ultraviolet rays have wavelengths toward the longer wavelengths in the ultraviolet band and below 291 nm.

2. The method of claim 1, wherein said ultraviolet light is applied for 9 hours for a kill rate for first larvae of 100%; for 48 to 72 hours for a kill rate of up to 100% for larvae; and 72 to 96 hours for a kill rate of up to 100% for adults.

3. The method of claim 1, wherein said ultraviolet light is applied to substantially eliminate aggregation pheromone activity.

4. The method of claim 1, wherein said ultraviolet light is applied to effect substantial impeding of melanization.

5. The method of claim 1, wherein said ultraviolet light is applied to effect substantial inhibiting of molting.

6. The method of claim 1, wherein said ultraviolet light is applied to substantially inhibit ootheca forming.

* * * * *